United States Patent [19]

Hare

[11] 4,195,747
[45] Apr. 1, 1980

[54] BAKING PAN AND METHOD OF FORMING SAME

[75] Inventor: Wilbert K. Hare, Lemont, Ill.

[73] Assignee: American Home Products Corporation, New York, N.Y.

[21] Appl. No.: 959,349

[22] Filed: Nov. 9, 1978

[51] Int. Cl.² ........................ B65D 21/02; B65D 7/42
[52] U.S. Cl. ................................ 220/23.2; 220/23.8; 220/72
[58] Field of Search ............... 220/23.8, 23.6, 23.2, 220/20, 21, 62, 72; 206/514, 515, 518, 519; 229/2.5; D7/38, 85, 96; D9/183, 184, 187, 219

[56] References Cited

U.S. PATENT DOCUMENTS

| 663,921 | 12/1900 | McMullen | 220/23.2 X |
| 1,667,793 | 5/1928 | Mauser | 220/72 |
| 1,671,450 | 5/1928 | Ross | 220/23.2 X |
| 2,037,821 | 4/1936 | Prabell | 220/23.2 X |

*Primary Examiner*—Steven M. Pollard
*Attorney, Agent, or Firm*—Robert D. Teichert

[57] ABSTRACT

A hearth bread baking pan set and method for making same in which a single sheet of material formed to provide an inner structure having multiple baking molds with rib members between adjacent molds is disposed within and secured to an outer structure. The outer structure and rib members cooperate to provide a support structure for the baking molds, spaced therefrom.

8 Claims, 14 Drawing Figures

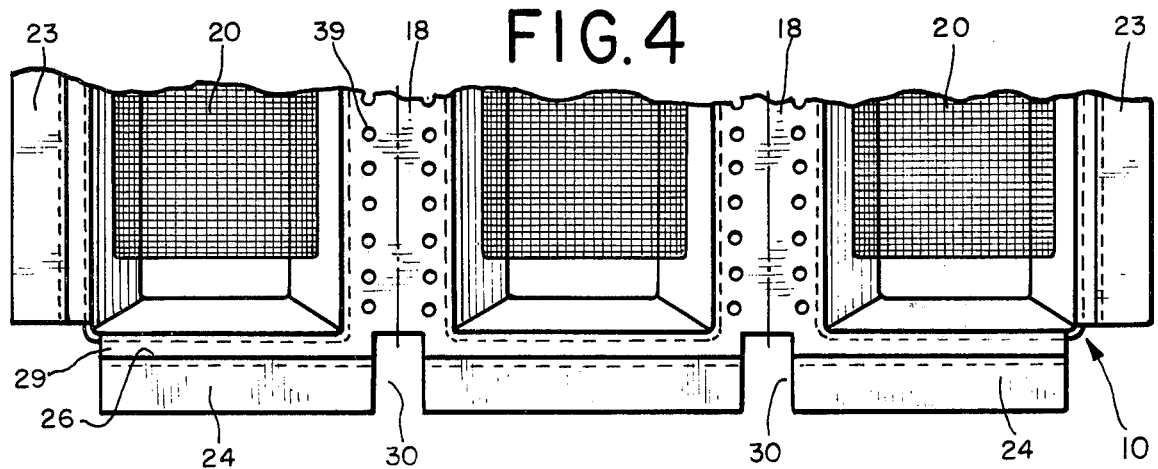
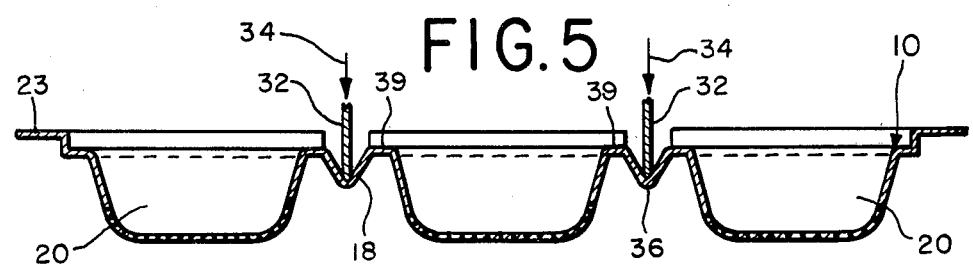
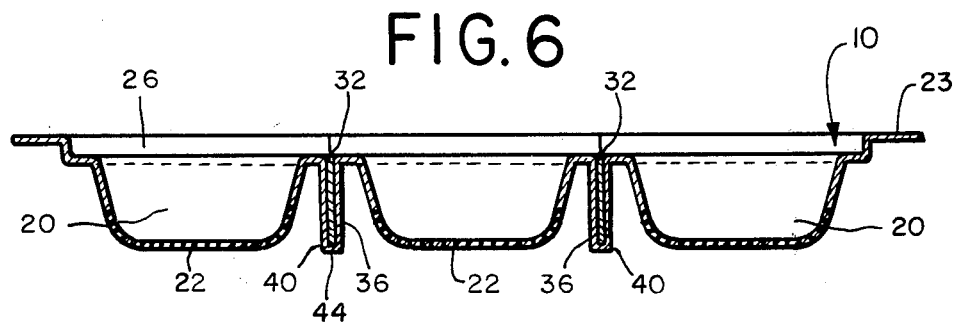
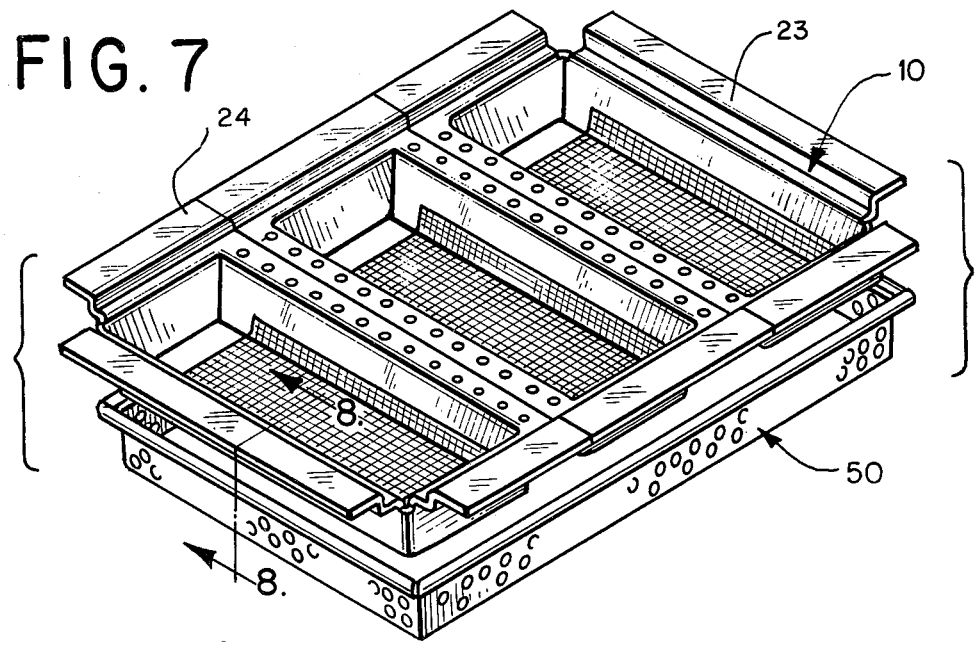

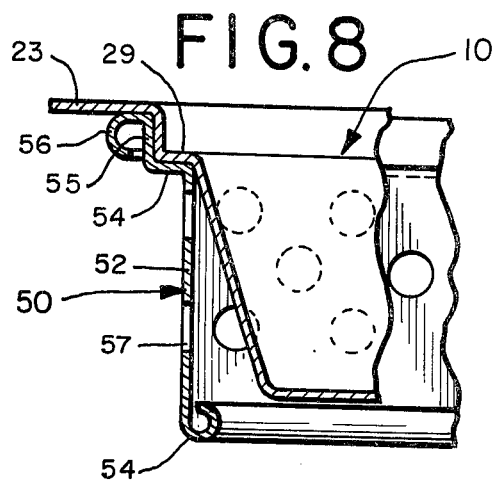
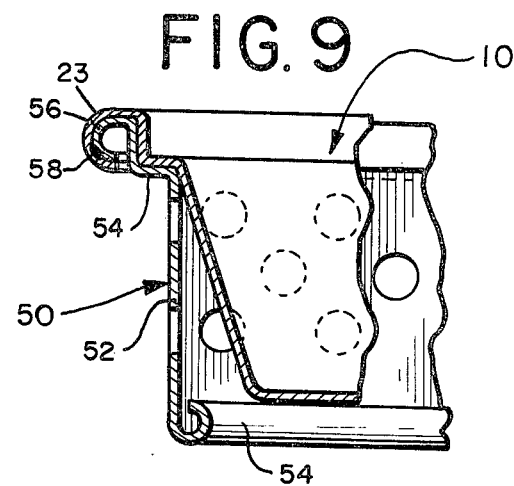
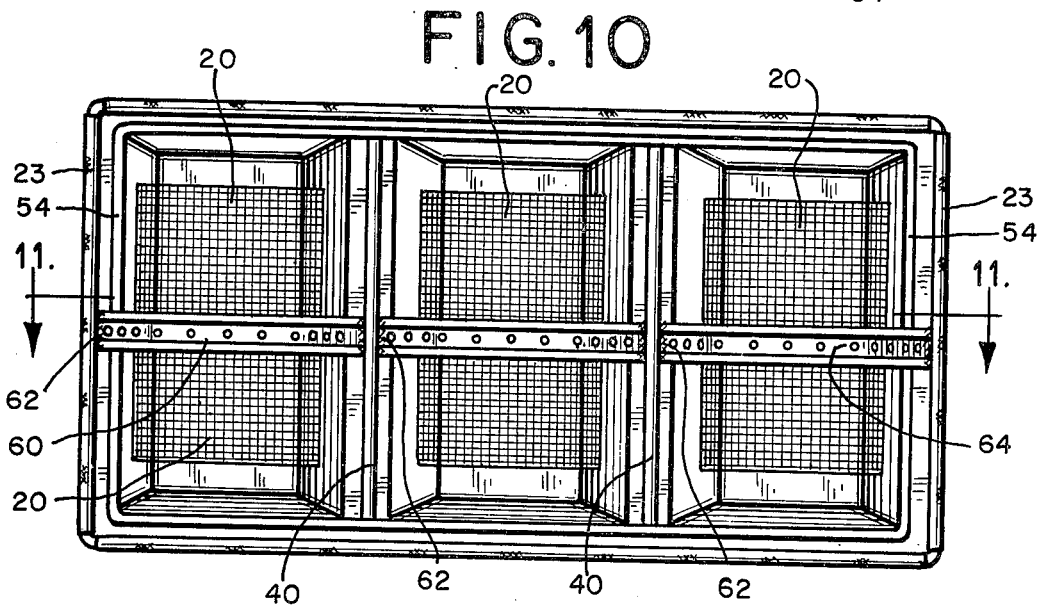
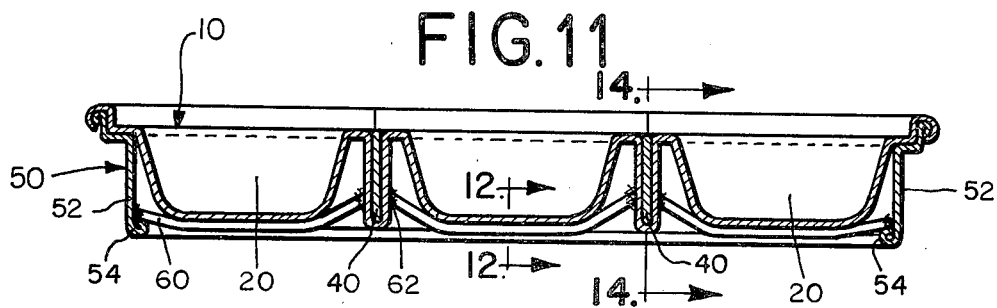
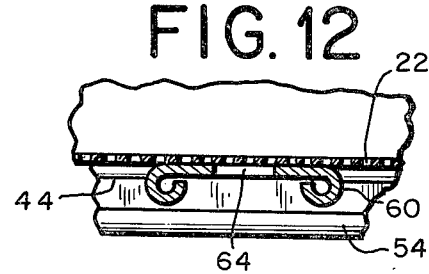

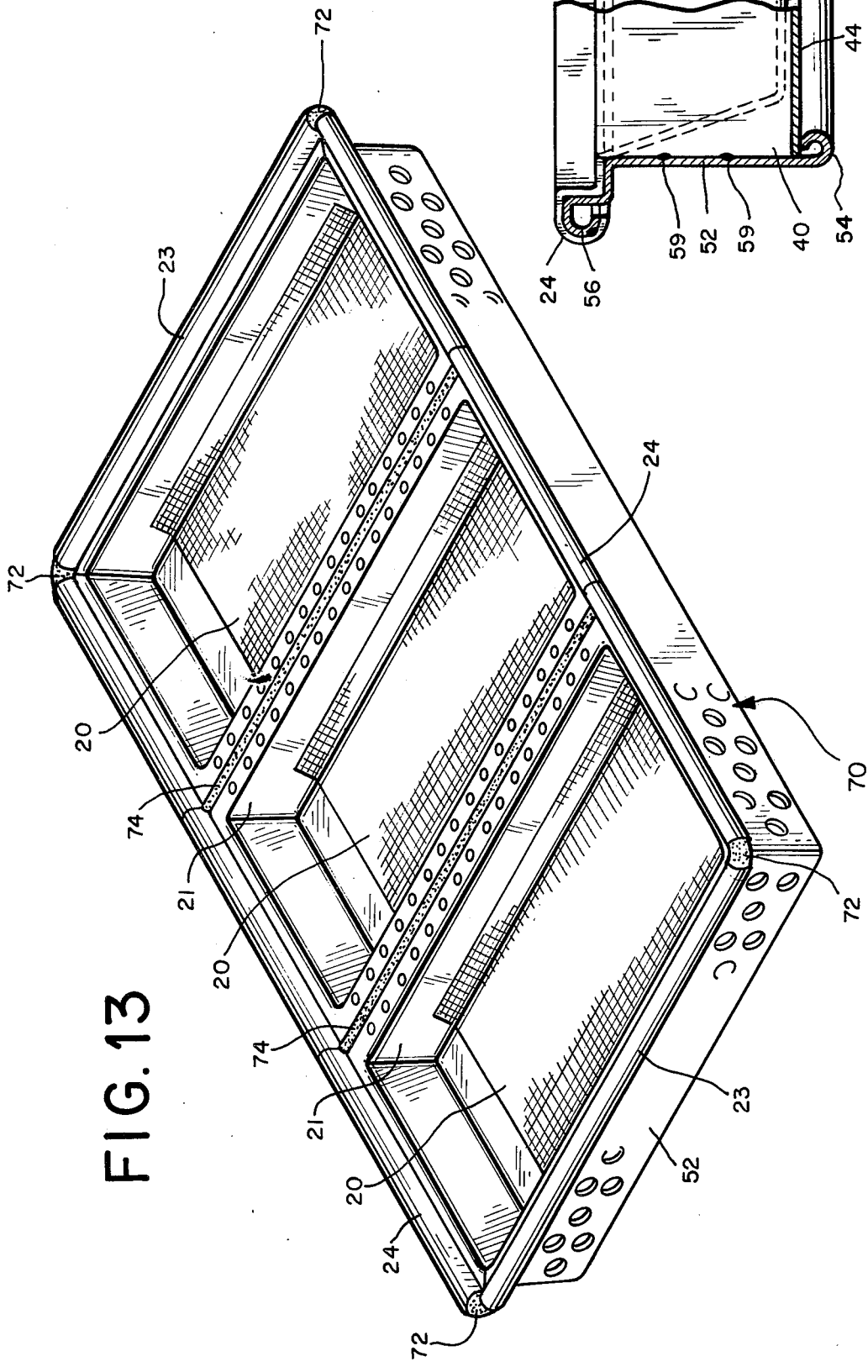
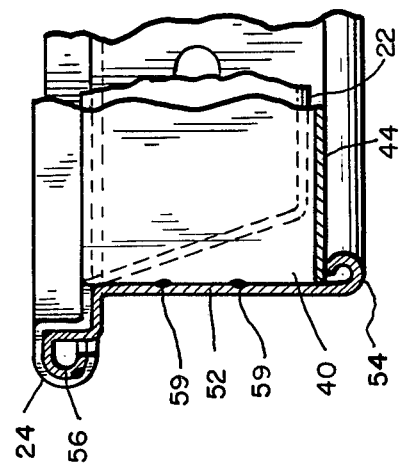
FIG. 13
FIG. 14

BAKING PAN AND METHOD OF FORMING SAME

BACKGROUND OF THE INVENTION

This invention relates to baking pans and more particularly to hearth bread pan sets for use in bakery operations with automatic equipment.

The baking of a hearth bread, such as rye bread, involves utilizing a pan that gives a maximum exposure of the baking dough to the oven heat and maximum heat circulation around the dough. Accordingly, the pan normally is comprised of an inner insert or screen which is a finely perforated lightweight material that is suspended from and secured to an outer shroud or frame formed from a heavy gauge material. Quite obviously the inner screen designed to offer maximum exposure to hearth heat is inherently weak and the surrounding frame which provides rigidity and strength must do so while permitting maximum heat circulation.

When such hearth pans are used in commercial baking operations, several pans are joined together, as by strapping, and to accommodate automatic equipment special indexing components are secured to the pan frames or the strapping.

In addition, while drawn baking pans are to be preferred over folded-end pans or welded pans, both for sanitation and economic benefits, the above described complex construction of hearth pans does not take advantage of those benefits. Even in those instances when the inner screen is drawn to form multiple baking cavities from a single sheet, each cavity is protected by its own outer frame which, in turn, are joined together and to which indexing components are added to accommodate the automatic baking equipment.

Hearth bread pan sets are a contradiction in construction inasmuch as they must be open structures, and therefore relatively fragile, to meet baking characteristics, but they must also be strong and stabile structures to work within automatic bakery operations. The collage of components that are fabricated and assembled to meet the criteria of hearth bread baking makes the prior art hearth bread pan set a cumbersome and expensive bakery item. Also, such prior art pans do not meet the sanitation requirements of the baking industry.

SUMMARY OF THE INVENTION

The present invention contemplates the provision of a hearth bread pan set having a plurality of cavities or molds formed from a single sheet of lightweight material, said sheet also being formed to provide in conjunction with a unitary frame member a rigid support framework surrounding and supporting the molds, and including components for use with automatic bakery production equipment.

Specifically, a single sheet of light gauge tin-plated steel having appropriate perforated and non-perforated areas is formed to provide a plurality of molds suitable for holding and confining a determined amount of bread dough through a baking operation. Portions of material between adjacent molds are manipulated to form depending rib members which provide added strength and stability to the adjoining molds and serve as an indexing component in cooperation with automatic bakery equipment. In addition, portions of the material at the periphery of the sheet are formed for manipulation with and securement to a heavy gauge frame member which provides a protective outer shroud for the molds. Such frame member or shroud provides a means for maintaining the integrity of the molds while allowing adequate heat circulation and providing support to keep the molds from contact with conveyors or hearth.

Hearth bread pan sets made as above described, and as hereinafter more fully described, will enjoy the economies of fabrication and assembly, as well as the improved sanitation aspects which attend pan-forming from a single sheet of material and the utilization of a unitary frame construction. The elimination of manufacturing steps and the reduction of material in the forming of hearth bread pan sets are within the objectives of my invention, whereas improved heat circulation for faster, more uniform baking and compatibility with automatic equipment are advantages specifically achieved. The overcoming of previously mentioned disadvantages and providing the described advantages are obtainable by utilizing my invention, without impairing the strength and stability needed to withstand abuses of mechanical and hand handling of the pan sets. Other objects and advantages will become apparent from the description of a preferred embodiment.

DESCRIPTION OF THE DRAWINGS

FIG. 4 is an enlarged fragmentary view of FIG. 2 further trimmed to provide notching in certain portions of the peripheral flanges of the sheet material.

FIG. 5 is a sectional view similar to FIG. 3 showing partial formation of rib members between molds.

FIG. 6 is a sectional view similar to FIG. 5 showing the rib members between molds fully formed.

FIG. 7 is an exploded view in perspective showing the sheet material formed to provide a plurality of molds and rib members disposed between the molds ready for insertion into a frame member.

FIG. 8 is an enlarged sectional view taken along lines 8—8 of FIG. 7 but showing the formed sheet material inserted into the frame member.

FIG. 9 is a sectional view similar to FIG. 8 showing the securement of the peripheral flange portion of the formed sheet material to the frame member to provide a pan set.

FIG. 10 is a bottom view of a pan set showing placement of panner stop bars.

FIG. 11 is a sectional view taken along lines 11—11 of FIG. 10.

FIG. 12 is an enlarged sectional view taken along lines 12—12 of FIG. 11.

FIG. 13 is a top perspective view of a completed hearth pan set.

FIG. 14 is an enlarged sectional view taken along lines 14—14 of FIG. 11.

DESCRIPTION OF THE PREFERRED EMBODIMENT

Figure 1:
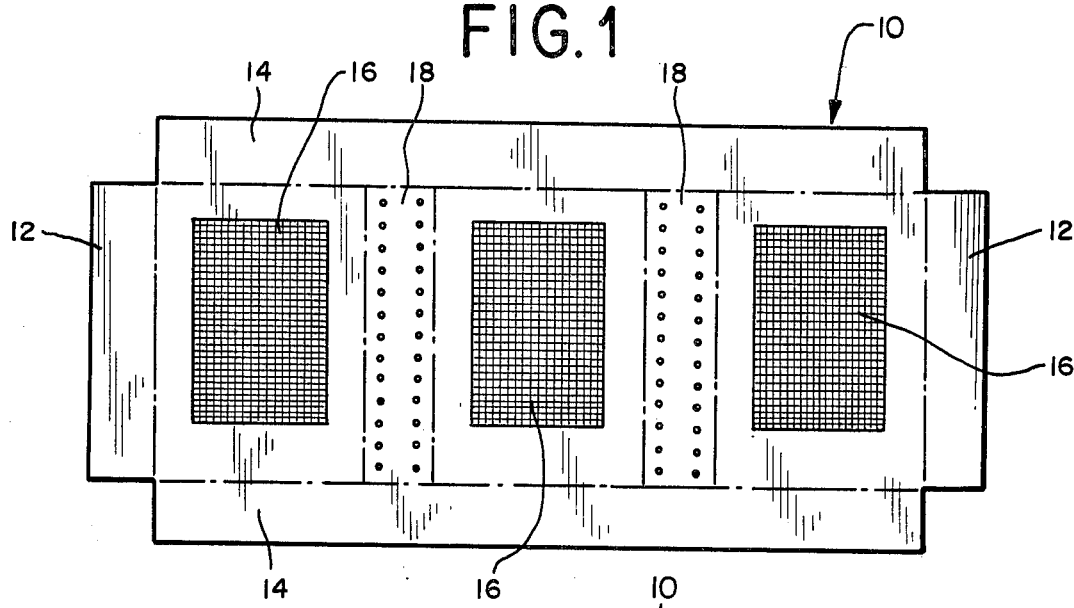
FIG. 1 is a top plan view of a sheet of material trimmed to forming size and having defined perforated areas.

As shown in FIG. 1 a flat sheet of material, such as light gauge tin-plated steel, designated by the reference numeral 10 is trimmed to a generally rectangular shape with notched corners to provide peripheral end portions 12 and side portions 14. As indicated by reference numeral 16 certain areas of the sheet material are finely perforated in a specific configuration, whereas other areas, indicated by reference numeral 18, are provided with medium sized perforations arranged in an in-line pattern.

Figure 2:
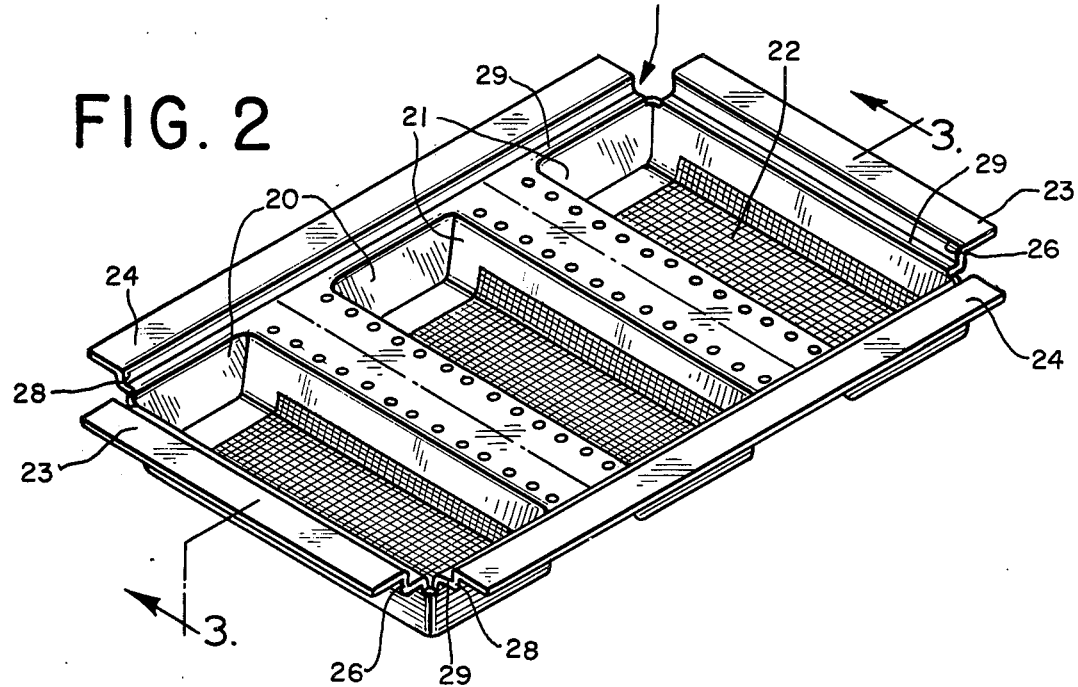
FIG. 2 is a top perspective view of the sheet material of FIG. 1 formed to provide a plurality of molds and peripheral flanges.

Referring now to FIG. 2, the sheet material 10 has, through a "drawing" process well-known in the art, been shaped to provide cavities or molds 20 from the finely perforated areas 16 having side walls 21 and bottom walls 22, and the peripheral end portions 12 and side portions 14 have been re-formed to provide outwardly extending end flanges 23 and side flanges 24, respectively, which lie in a plane slightly above the plane of the sheet material 10 and connected thereto by the upstanding portions 26 and 28, respectively. It is noted that in the forming of the molds 20 and the flanges 23 and 24, the mold side walls 21 and the flange upstanding portions 26 and 28 define a flat portion or shoulder 29 therebetween, the purpose of which will be described later.

Figure 3:
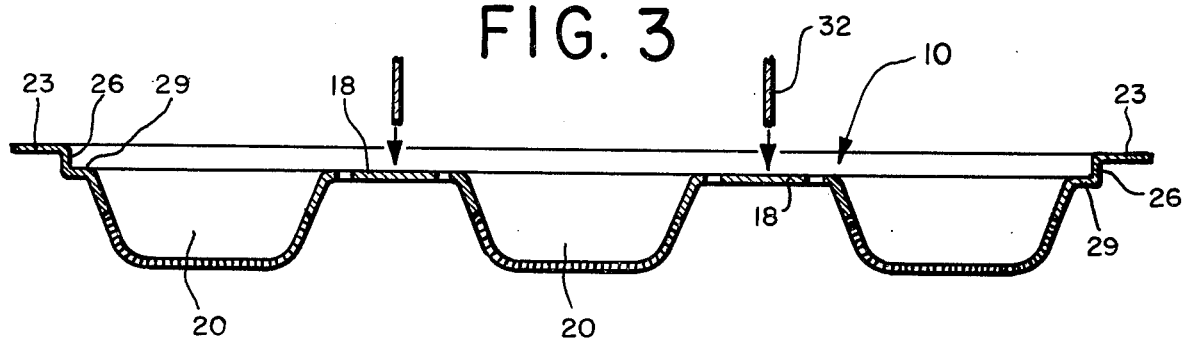
FIG. 3 is a sectional view on enlarged scale taken along lines 3—3 of FIG. 2.

FIG. 3, which is an enlarged vertical section taken lengthwise of the formed sheet material of FIG. 2, shows the disposition of the end flanges 23 and the molds 20 relative to the areas 18 which lie in the original plane of the flat sheet material.

Referring now to FIG. 4, there is shown an enlarged fragmentary plan view of the formed sheet material of FIG. 2 wherein the side flanges 24 and portions of the adjacent areas 18 have been notched and trimmed as indicated at reference numeral 30 to remove material for a purpose to be now described.

Forming bars 32 are disposed centrally and above the areas 18 lying between molds 20 (see FIG. 3) extending widthwise of the formed sheet material substantially from side-to-side. Relative movement of the forming bars 32 and the formed sheet material 10 toward one another, which can be accomplished in any acceptable manner as indicated by directional arrows 34, will result in deformation of the areas 18 as indicated in FIG. 5. Such deformation of the areas 18 is designed to articulate the central portion thereof, indicated by reference numeral 36, downwardly while flat portions 38 which have medium size perforations 39 formed therein remains in the original plane of the sheet material.

Completed deformation of the areas 18, as shown in FIG. 6, provides rib members 40 comprised of the forming bar 32 entrapped by the central portion 36 being folded-back upon itself. Such multi-thickness of the rib members 40 provides a rigid and strong support of the formed sheet material 10 and extends below the bottom walls 22 of molds 20, as indicated at 44, to function as a panner bar for indexing in cooperation with automatic bakery equipment. As indicated by reference to FIGS. 3, 4, 5 and 6, the described deformation to form rib members 40 is aided by the notces 30 so that horizontal movement of the sheet material in a lengthwise direction is permitted, moving the molds 20 toward each other and the portions of side flanges 24 and upstanding portions 26 separated by notches 30 into abutment.

As shown in FIG. 7, the sheet material 10 formed as hereinabove described is ready for disposition within and securement to an underlying frame member 50. Such disposition and securement can be best explained by reference to FIGS. 8 and 9, it being understood that while such explanation will be directed to the interrelatiohship of the end flange 23 and the underlying frame member 50, a like interrelationship exists between the side flange 24 and the underlying frame member 50, as shown in FIG. 14.

The frame member 50 is of rectangular configuration providing a main vertical body portion 52 having a bead 54 formed at the lower end thereof, and having the upper end formed to provide a horizontal shoulder or ledge 54, a vertical rim 55 extending upwardly from said ledge and terminating in an outwardly extending curled flange 56. For a purpose to be described later, the main body portion 52 of said frame member has large perforations 57 formed therethrough.

When the formed sheet material 10 is inserted into the frame member 50 the flange 23 and shoulder 29 of the sheet material rests upon the curled flange 56 and ledge 54 of the frame member, respectively, and manipulation of the flange 23 to conform to the curled flange 56 secures the formed sheet material to the frame member. Spot welding, as indicated by numeral 58, may be utilized to confirm the securement of flange 23 to flange 56. The securement of frame member 50 and the formed sheet material 10 with reference to side flanges 24 is illustrated in FIG. 14 wherein the rib member 40 is shown secured to the frame main body 52 as by weldments 59.

As shown in FIGS. 10, 11 and 12 lengthwise supports or panner stop bars 60 are positioned to underly the molds 20 and are secured to rib members 40, or to a rib member 40 and the frame body portion 52, as the case may be, by weldments 62. Said supports 60 are formed to provide perforations 64 therethrough.

Referring now to FIG. 13, there is shown a perspective view of a completed hearth bread pan set 70 made in accordance with my invention. Corner weldments of adjacent flange portions indicated at 72 and silver soldering of the rib members indicated at 74 may be utilized to enhance the sanitation aspects of the completed pan set.

It should be clear from the foregoing description and with reference to the drawings that the hearth bread pan set made in accordance therewith provides a construction with improved heat circulation during the baking process and improved detergent circulation during the cleaning process. The pan set is produced in a relatively simple manner that reduces the number of manufacturing steps as well as the number of separate components required in assembly, and reduces the amount of material heretofore required for a comparable pan set. Such an improved pan set is sufficiently strong and stabile as to withstand the abuses of automatic bakery operation and maintain the integrity of the inner, relatively fragile mold structure. It should also be apparent the various changes may be made in the form, construction and arrangement of parts in my preferred embodiment without departing from the spirit and scope of my invention or sacrificing all of its advantages.

Having now described my invention, what is claimed is:

1. A baking pan set comprising an inner structure formed from a single rectangular sheet of material to provide multiple baking molds depending from the sheet material and arranged in a row lengthwise of said sheet, rib members formed from the sheet material between adjacent baking molds and depending therefrom downwardly a distance sufficiently to dispose the lowermost portion of said rib members below the bottom walls of the baking molds, outwardly extending flanges formed at the periphery of the sheet material, an outer frame-like structure of rectangular shape having a vertically disposed main body terminating at the upper end thereof in outwardly extending flanges underlying and secured to said inner structure flanges, whereby said inner structure is disposed within and supported by said outer frame-like structure.

2. A baking pan set according to claim 1 wherein said rib members are characterized as each having a forming bar entrapped between a folded back portion of the sheet material whereby the rib member has a cross-sectional thickness at least three times the cross-sectional thickness of said sheet material.

3. A baking pan set according to claim 1 wherein the rib members extend widthwise to abutment with and securement to the frame main body.

4. A baking pan set according to claim 3 wherein the rib members are characterized as each having a forming bar entrapped between a folded back portion of the sheet material whereby the rib member has a cross-sectional thickness at least three times the cross-sectional thickness of said sheet material.

5. A baking pan set according to claim 3 wherein the sheet material is light gauge metal having perforations formed in the walls of the baking molds and the frame-like structure is heavy gauge metal having perforations formed in the main body portion.

6. A baking pan set according to claim 5 wherein the sheet material is light gauge metal having perforations formed in the walls of the baking molds and the frame-like structuure is heavy gauge metal having perforations formed in the main body portion.

7. The method of forming a baking pan set comprising drawing a rectangular sheet of metal material to form baking molds depending therefrom, arranged in side-by-side relation in a single row lengthwise of said sheet, forming outwardly extending flanges at the periphery of the sheet material, deforming portions of the sheet material between adjacent baking molds downwardly to form a multi-thickness rib member extending below the plane defined by the bottom walls of said baking molds, inserting the formed sheet material into a rectangular frame having outwardly extending flanges formed at the top of said frame, and securing the sheet material flanges to the frame flanges.

8. The method of forming a baking pan set according to claim 7 and including securing the rib members to the frame.

* * * * *